ELECTRONIC CODE PULSE TRANSMITTING CIRCUIT

Filed Oct. 17, 1950 4 Sheets-Sheet 1

INVENTOR
W. H. T. HOLDEN
BY C. Mattice
ATTORNEY

ELECTRONIC CODE PULSE TRANSMITTING CIRCUIT

INVENTOR
W. H. T. HOLDEN
BY C. Mattice
ATTORNEY

INVENTOR
W. H. T. HOLDEN
BY C. Mathie
ATTORNEY

ELECTRONIC CODE PULSE TRANSMITTING CIRCUIT

Filed Oct. 17, 1950 4 Sheets-Sheet 4

INVENTOR
W. H. T. HOLDEN
BY C. Mathie
ATTORNEY

Patented Dec. 25, 1951

2,580,095

UNITED STATES PATENT OFFICE 2,580,095

ELECTRONIC CODE PULSE TRANSMITTING CIRCUIT

William H. T. Holden, Pasadena, Calif., assignor to Bell Telephone Laboratories, Incorporated, New York, N. Y., a corporation of New York Application October 17, 1950, Serial No. 190,492

3 Claims. (Cl. 179—16)

This invention relates to telephone systems and has for its object greater efficiency in transferring designations from one office to another.

In automatic telephone systems, particularly those employing cross-bar switches, for example as shown in the application of A. J. Busch, Serial No. 57,394, filed October 29, 1948, when a call is to be extended from one office to another office, all or a part of the called line designation must be transmitted to the second office. To do this, an outgoing sender at the first office is connected over the interoffice trunk which will be used for conversation to an incoming register at the second office.

Designations may be transferred by many types of signals including numerical dial type pulses, various codes of direct-current pulses and codes of alternating-current pulses. A preferred form of alternating-current code employs five frequencies, two of the five frequencies representing each digit, the two frequencies being transmitted simultaneously. The pulses representing the various digits are sent in sequence and it has been customary to employ chains of relays to control this sequential operation.

In accordance with the present invention a series of gas-filled tubes is employed for controlling the sequential sending of the code pulses, each tube serving to enable the two alternating-current generators selected by the corresponding register to thereby transmit the appropriate code.

The invention will be more clearly understood from a consideration of the following description in connection with the drawings in which:

Fig. 2 shows the steering circuit and a plurality of registers;

Fig. 5 shows the manner in which Figs. 2 and 3 are to be combined; and

Fig. 6 shows the manner in which Figs. 2 and 4 are to be combined.

Reference is made to the above-identified Busch application for a description of the operations of a complete system which have been omitted from the present disclosure or only briefly described therein.

Figure 1:
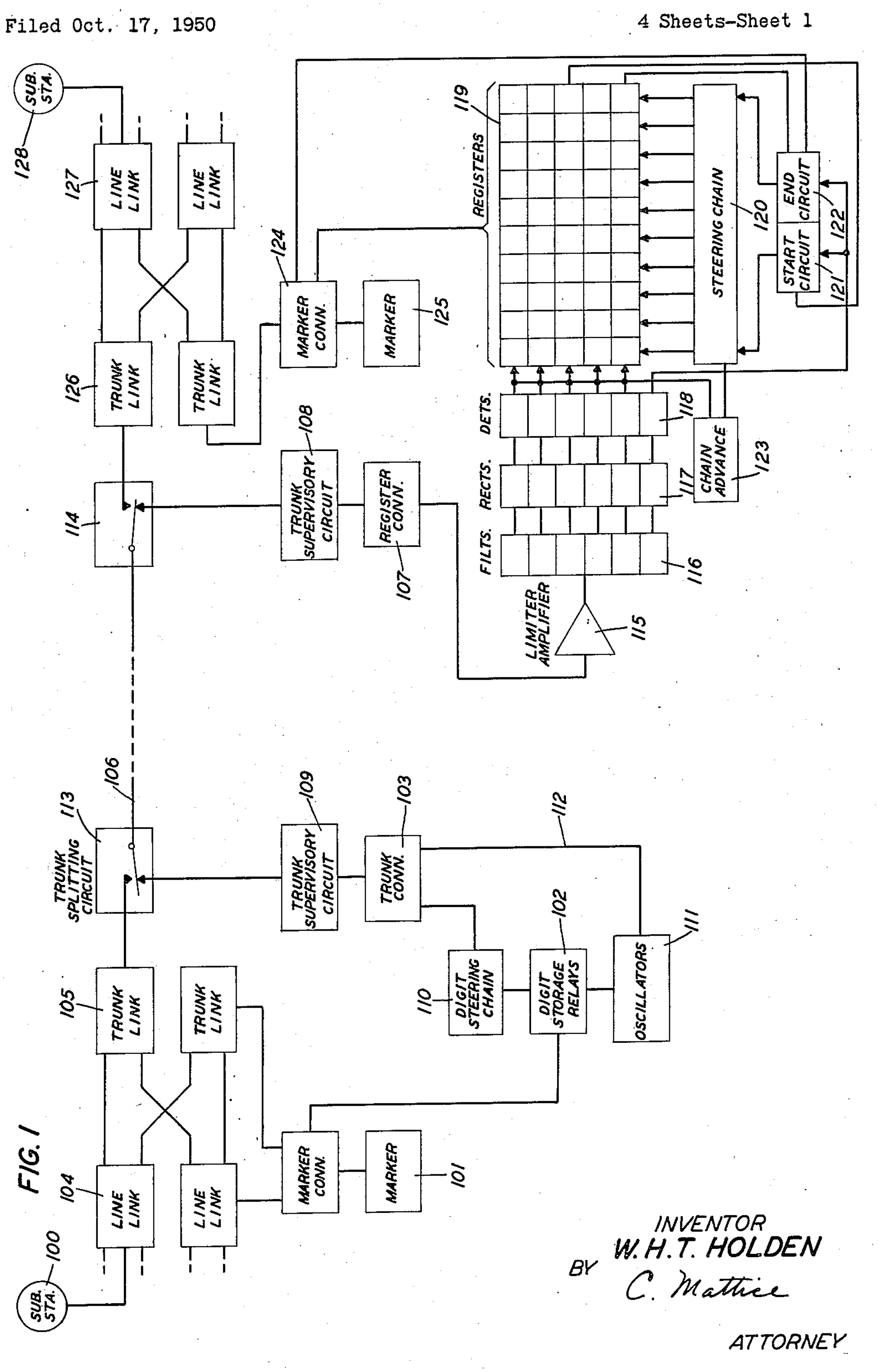
Fig. 1 is a diagrammatic showing of a system to which the invention is applicable.

Referring first to Fig. 1, when the subscriber at station 100 initiates a call, his line is connected with a register sender (not shown) in which he registers the designation of the wanted line. The register sender then calls in a marker 101 and transfers the designation to the marker. The marker translates that part of the designation identifying the office in which the wanted line is located and selects a trunk 106 outgoing to that office. Having also determined that the office is one requiring alternating current code pulses, the marker selects a sender including the apparatus disclosed, transfers the line designation to the digit storing relays 102 of the selected sender and operates the trunk connector 103 to connect the sender with the selected trunk. The marker then connects with and operates the line link switches 104 and trunk link switches 105 to connect the calling line with the trunk and releases.

The seizure of trunk 106 causes the register connector 107 to connect an incoming register with trunk 106. When the register is ready to receive pulses, it causes the trunk supervisory circuit 108 at the called office to transmit a signal over trunk 106 which is repeated by the trunk supervisory circuit 109 at the calling office to the sender.

In response to this signal, the digit steering chain 110 functions to successively enable those two of the oscillators 111 which have been selected by the digit storage relays 102, the enabled oscillators transmitting alternating current over pulsing circuit 112 which has been extended to the receiving equipment of the register at the wanted office. It may be noted that the talking circuit is held disconnected from the trunk during the designation transfer by means of the trunk splitting circuits 113 and 114.

In the register, the alternating current code signals are received by a limiter amplifier 115, tuned filters 116, rectifiers 117 and detectors 118 which selectively operate the registers 119 which are successively rendered responsive by the steering chain 120. Each designation is preceded by a start signal which operates start circuit 121 to initiate the operation of the steering chain 120, the steering chain 120 being advanced in response to the reception of each digit under the control of the chain advance circuit 123. Following the last digit an end signal is sent which operates the end circuit 122.

The end circuit 122 in turn operates marker connector 124 which connects an idle marker 125 with the register, whereupon the registered designation is transferred to the marker 125 which in turn connects with and operates trunk link switches 126 and line link switches 127 to connect trunk 106 with the wanted subscriber's line 128. The trunk splitting circuits 113 and 114 now operate to disconnect the sender and register and complete the talking connection between substations 100 and 128. Ringing and supervision takes place in the well-known manner.

Suitable circuits for the register at the called office may be found in applicant's copending application, Serial No. 190,493, filed October 17, 1950.

The arrangement according to Fig. 5 will be described first. In Fig. 2 are shown five of the seven registers required for registering the seven digits of a telephone designation, namely, the two registers 210 and 220 on which the first two letters of the office name are registered and the three registers 250, 260 and 270 on which the hundreds, tens and units digits of the line number are registered. The two registers, not shown, which would be used to register the third digit of the office designation and the thousands digit of the line designation are substantially the same as the registers shown.

Each digit register includes five relays, of which the first three and the last are shown. These relays are operated from the marker through marker connector 300 to register a digit in accordance with a two-out-of-five code. This code may be illustrated by the following table, as applied to register 210, assuming that the relay which is omitted is numbered 214(A4):

| Digit: | Relays registered |
|---|---|
| 0 | 214(A4), 215(A7) |
| 1 | 211(A0), 212(A1) |
| 2 | 211(A0), 213(A2) |
| 3 | 212(A1), 213(A2) |
| 4 | 211(A0), 214(A4) |
| 5 | 212(A1), 214(A4) |
| 6 | 213(A2), 214(A4) |
| 7 | 211(A0), 215(A7) |
| 8 | 212(A1), 215(A7) |
| 9 | 213(A2), 215(A7) |

Figure 3:
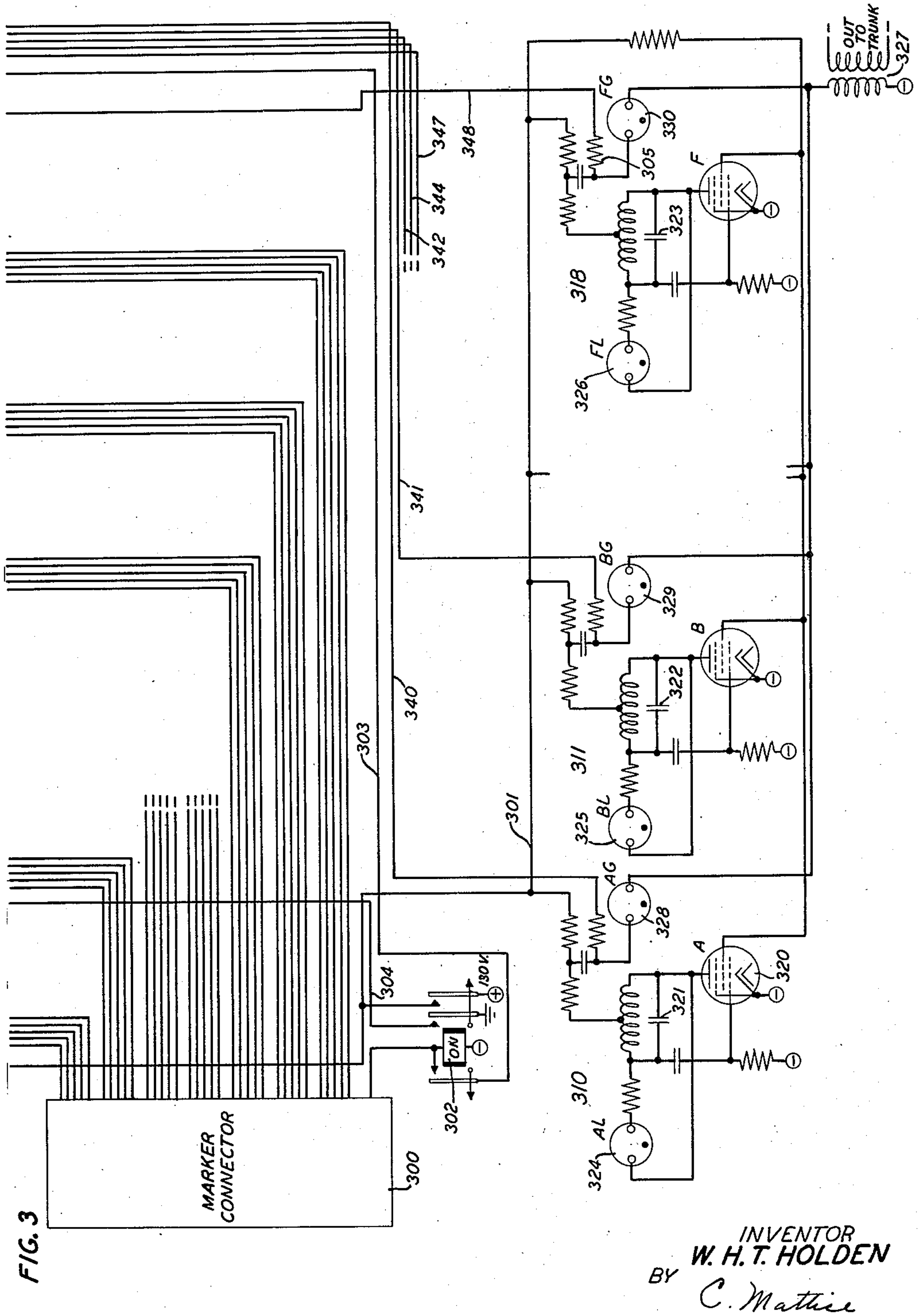
Fig. 3 shows one type of alternating-current generator.
Figure 4:
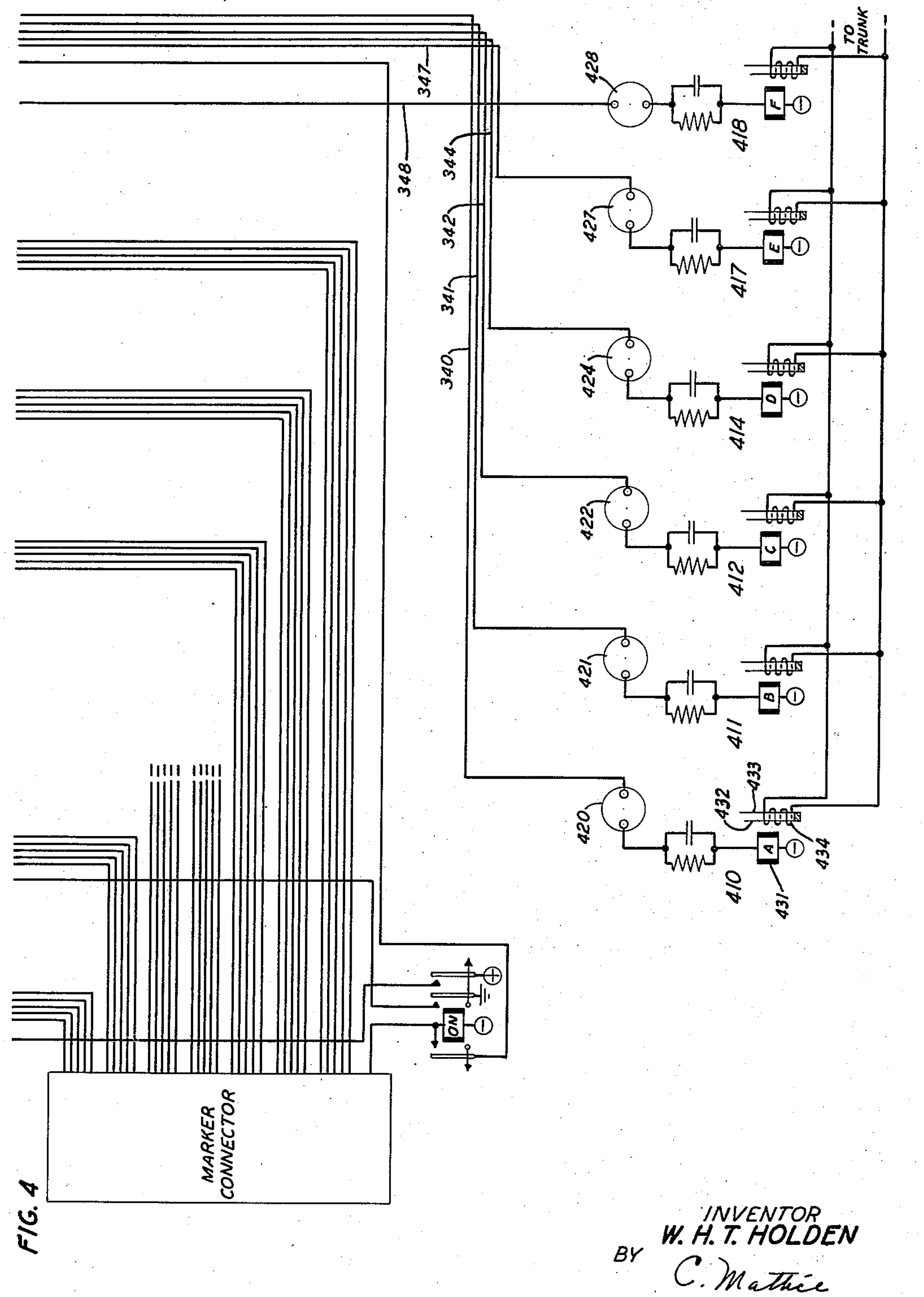
Fig. 4 shows an alternate type of alternating-current generator.

The oscillators 310 to 318 of Fig. 3 are of the inductance capacity type employing a pentode tube such as tube 320. These oscillators are individual to the sender and are tuned by the selection of condensers 321, 322, 323, etc. of such values that the desired frequencies will be generated. The amplitude of the frequency generated is controlled by neon glow lamps 324, 325, 326, etc. The output of the oscillators is connected to a common output transformer 327 only when the associated one of the gate glow lamps 328, 329, 330, etc. is energized in the manner to be described.

Six oscillators are provided, one for each of the five frequencies required by the digit code and one for use in transmitting start and end signals. These frequencies may conveniently be as follows:

| Oscillator: | | Frequency |
|---|---|---|
| 1 (310) | cycles | 700 |
| 2 (311) | do | 900 |
| 3 | do | 1100 |
| 4 | do | 1300 |
| 5 | do | 1500 |
| 6 (318) | do | 1700 |

When the marker selects the sender, it closes a circuit for off-normal relay 302, which operates and locks over conductor 303 to ground over the back contact of relay 200. Relay 302 connects +130-volt battery to conductor 301 to start the oscillators and to prepare the gas-filled tubes of the steering chain for operation. It also connects ground to conductor 304 to provide locking ground for the register relays which are operated by the marker.

When the marker has operated the register relays and checked that they have operated and locked, and has connected the sender with the selected trunk, the marker disconnects from the sender.

When the equipment at the distant office is ready to receive the designation, a signal is transmitted to the trunk circuit which then operates relay 201 to start out-pulsing.

Relay 201 connects +130-volt battery on conductor 301 through resistance 202 to condenser 203 which is connected to ground through resistance 204 and to the control anode of tube 205 through resistance 206. Condenser 203 starts to charge and when the charge reaches the breakdown potential for tube 205, that tube breaks down and relay 207 operates across the main gap.

With relay 207 operated +130-volt battery from conductor 301 is connected through resistance 208, left contact of relay 207, conductor 348 through resistance 305 to glow tube 330 which breaks down and permits the 1700-cycle output of oscillator 318 to pass to the output transformer 327. A similar circuit is closed from conductor 301 through resistance 209 over the right contact of relay 207 and conductor 342 to the third oscillator (not shown) which generates the 1100-cycle frequency causing that frequency also to pass to the output transformer 327. Therefore, a start signal made up of frequencies of 1100 cycles and 1700 cycles is transmitted to the distant office to prepare the register at that office to receive the digit pulses.

With tube 205 conducting, the cathode potential becomes positive and this positive potential is applied through resistance 290 to condenser 291 which charges. Condenser 291 is connected through resistance 292 to the control anode of tube 293 and when a sufficient charge is built up on condenser 291, tube 293 breaks down. This breakdown creates a surge through condenser 294 so that tube 205 is extinguished by cathode commutation.

In a similar manner condenser 295 is charged to cause tube 296 to break down, creating a surge through condenser 297 to extinguish tube 293. Condenser 298 charges more slowly through the winding of relay 299 which operates in this charging current and is therefore operated for a measured interval determined by the time required to charge condenser 298.

With relay 299 operated, circuits are closed for enabling two of the oscillators as determined by the registration set up on register 210. Assuming that the digit 7 has been registered, relays 211 and 215 will have been operated. A circuit is therefore closed from +130-volt battery on conductor 301, resistance 289, right contact of relay 299, lower front contact of relay 211, conductor 340 to glow tube 328 which becomes conducting, permitting the 700-cycle output of oscillator 310 to pass to output transformer 327. A similar circuit is closed from conductor 301 through resistance 288, left contact of relay 299, upper front contact of relay 215 over conductor 347 to the glow tube associated with the fifth oscillator, permitting the 1500-cycle output of that oscillator to pass to transformer 327. Therefore, a two-frequency pulse consisting of 700-cycle and 1500-cycle curent is transmitted to the distant office where it brings about the registration of the digit 7.

Similarly, each of the steering tubes is operated, extinguishing the previously operated tube to cause the transmission of two-frequency pulses as determined by the registration on the associated register.

If a complete seven-digit number has been registered and sent out, following the sending of the seventh digit, tube 287 is operated in turn operating relay 200. With relay 200 operated a circuit is closed from +130-volt battery on conductor 301, resistance 286, left contact of relay 200, conductor 348 to glow tube 330 to operate that tube and cause the 1700-cycle output of oscillator 318 to pass to transformer 327. A second circuit is closed from conductor 301 through resistance 285 over the right contact of relay 200 to conductor 347 to render conducting the glow tube associated with the fifth oscillator and to cause the 1500-cycle output of that oscillator to pass to the transformer 327. These two frequencies constitute an end signal and tell the distant office that no further pulses are to be expected.

Relay 200 disconnects ground from conductor 303, opening the locking circuit of relay 302. Relay 302 is slow to release and after an interval opens its contacts to remove +130-volt battery from conductor 301, extinguishing tube 287, and ground from conductor 304, releasing the register relays and restoring the sender to normal.

If less than seven digits are registered, the steering chain functions in the same manner, but with none of the relays of a register operated, no oscillator enabling circuit is closed and no pulse is sent out at that time.

Figures 2, 5, 6:
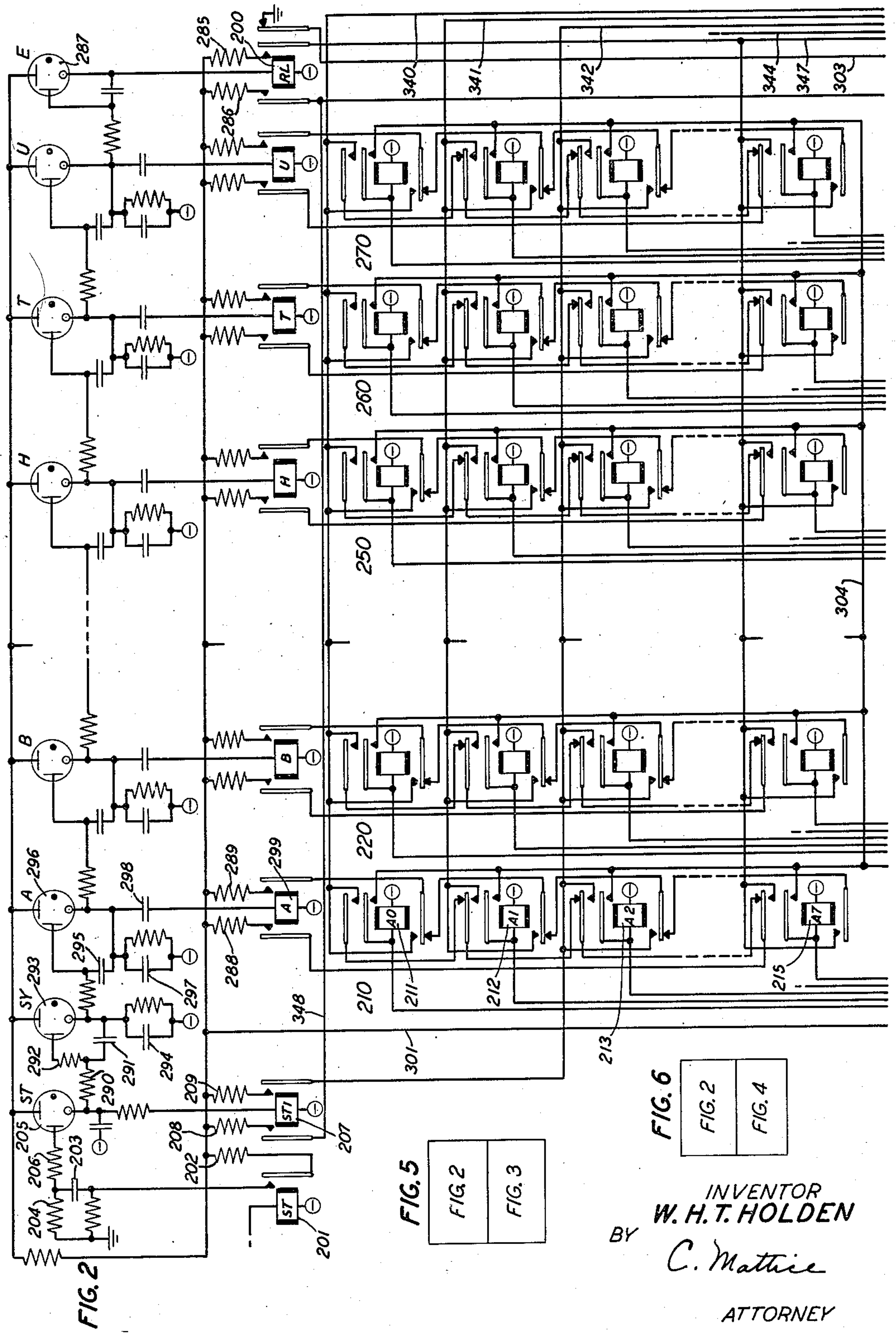

The arrangement according to Fig. 6 differs from that of Fig. 5 chiefly in the form of oscillator employed. These oscillators 410, 411, etc. are of the tuned reed type which are energized by a magnet rather than mechanically. For example, when relay 431 is energized, reed 432 is started and vibrates, transferring energy through a loose coupling to reed 433, which builds up its amplitude gradually as energy passes through the coupling means. Before energy transfer is complete, reed 432 is held magnetically and the vibrations of reed 433 decline in amplitude, energy being drained off by the coupling. Reed 433 is of magnetic material and as it vibrates it generates an alternating current in output winding 434.

The mechanical oscillators 410 to 417 are tuned to the same frequencies as are the electronic oscillators 310 to 318. The output windings of oscillators 410 to 417 are connected in parallel across the conductors outgoing to the trunk. When one of the distributor relays of Fig. 2, for example relay 299, operates it connects +130-volt battery to two of the conductors 340 to 347. Assuming that, as in the case previously described, +130-volt battery is connected to conductors 340 and 347, the neon glow tubes 420 and 427 become conducting, passing current to the energizing magnets of oscillators 410 and 417 so that these oscillators generate a pulse of alternating current of frequencies of 700 cycles and 1500 cycles which is transmitted directly to the conductors outgoing to the trunk. The duration of the pulse is determined by the mechanical characteristics of the oscillators, although the steering chain determines the interval between the start of successive pulses.

What is claimed is:

1. In a telephone system a plurality of digit registers, a plurality of alternating-current generators, means under the control of each of said registers for selecting said generators two at a time in accordance with a predetermined code, an out-pulsing circuit, means to connect said generators with said out-pulsing circuit, a chain of cold cathode tubes corresponding to said registers, means to successively energize said tubes one at a time, and means under the control of each tube to enable the generators selected by the corresponding register.

2. In a telephone system a plurality of digit registers, a plurality of alternating-current generators, means under the control of each of said registers for selecting said generators two at a time in accordance with a predetermined code, an out-pulsing circuit, means to connect said generators with said out-pulsing circuit, a chain of cold cathode tubes corresponding to said registers, means to successively energize said tubes one at a time, and means under the control of each tube to enable the generators selected by the corresponding register comprising a relay and a condenser in the output of each tube, the relay being operated during the charging time of said condenser.

3. In a telephone system a plurality of digit registers, a plurality of alternating-current generators, a neon glow tube individual to each of said generators, means under the control of each of said registers for selecting said generators two at a time in accordance with a predetermined code, an out-pulsing circuit, normally ineffective means including said glow tubes to connect said generators with said out-pulsing circuit, a chain of cold cathode tubes corresponding to said registers, means to successively energize said cold cathode tubes one at a time, and means under the control of each cold cathode tube to operate the glow tubes individual to the generators selected by the corresponding register to render said connecting means effective.

WILLIAM H. T. HOLDEN.

No references cited.